May 19, 1970     R. W. RUSSELL     3,513,423

THREE-PHASE MAGNETIC CORE

Filed Jan. 8, 1969     2 Sheets-Sheet 1

Inventor:
Robert W. Russell
By Richard C. Ruppin
Atty.

May 19, 1970    R. W. RUSSELL    3,513,423
THREE-PHASE MAGNETIC CORE

Filed Jan. 8, 1969    2 Sheets-Sheet 2

Inventor:
Robert W. Russell
By Richard C. Ruppin
Atty.

United States Patent Office 3,513,423
Patented May 19, 1970

3,513,423
THREE-PHASE MAGNETIC CORE
Robert W. Russell, New Concord, Ohio, assignor to McGraw-Edison Company, Elgin, Ill., a corporation of Delaware
Filed Jan. 8, 1969, Ser. No. 789,763
Int. Cl. H01f 27/24, 3/04
U.S. Cl. 336—211                                   14 Claims

ABSTRACT OF THE DISCLOSURE

A polyphase transformer core is provided in which each of two C-shaped core sections form an outer core leg and have two extending ends each bifurcated to form two sets of laminated furcations on each end. The C-shaped sections are arranged in opposing relation so that one set of laminated furcations on each end of each section abuts a set on the other section. The other set of laminated furcations on each end of a section are bent together in abutting relation so that two furcation sets of each C-shaped section are positioned back-to-back to form the center leg of the core.

---

This invention relates to polyphase electrical power transformers and in particular to a multi-legged magnetic core for polyphase transformers and to its method of construction.

The magnetic cores for many three-phase transformers have two inner, wound strip, closed core loops mounted back-to-back and surrounded by an outer, closed core loop wound from magnetic ribbon. The adjacent sides of the two inner loops constitute the center winding leg of the polyphase transformer with the outer sides of the inner core loops and the abutting side of the outer core loop constituting the two outer winding legs of the three-phase core. In such a magnetic core, most of the magnetic flux from the center core leg cannot return through the entire cross section of the outer winding legs and is principally concentrated in the portions of the outer legs formed by the inner loops, thus making it necessary for some of the magnetic flux to transfer from loop to loop perpendicular to the laminations. Flux transfer between inner and outer loops is quite difficult, however, because the reluctance to flux travel in a direction perpendicular to the laminations is quite high.

It is an object of the invention to provide an improved multi-legged core which affords improved magnetic coupling between the legs which links the phase coils of a multi-phase transformer.

It is a further object of the invention to provide an improved multi-legged magnetic core which permits transfer of magnetic flux between legs through magnetic strip material at an angle close to the direction of grain orientation and wherein flux transfer can occur along a substantial portion of the length of the magnetic flux paths.

Another object of the invention is to provide an improved three-legged magnetic core for a three-phase transformer wherein each lamination layer links all three phase coils and flux transfer between the core legs is through grain-oriented magnetic strip at an angle close to the orientation of the grain.

These and other objects and advantages of the invention will be more readily apparent from the following detailed description when considered in conjunction with the accompanying drawings wherein.

Figure 4:
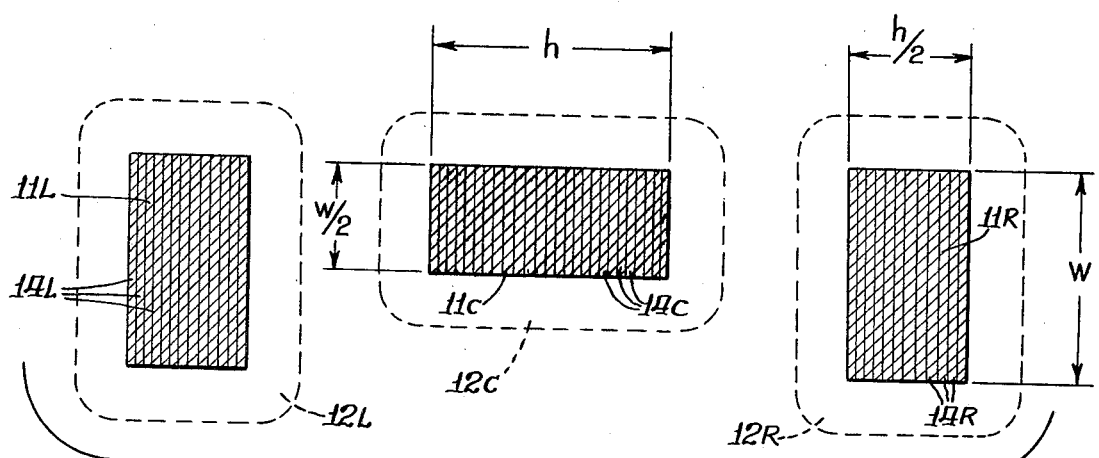
FIG. 4 is a view taken along line 4—4 of FIG. 3.
Figure 3:
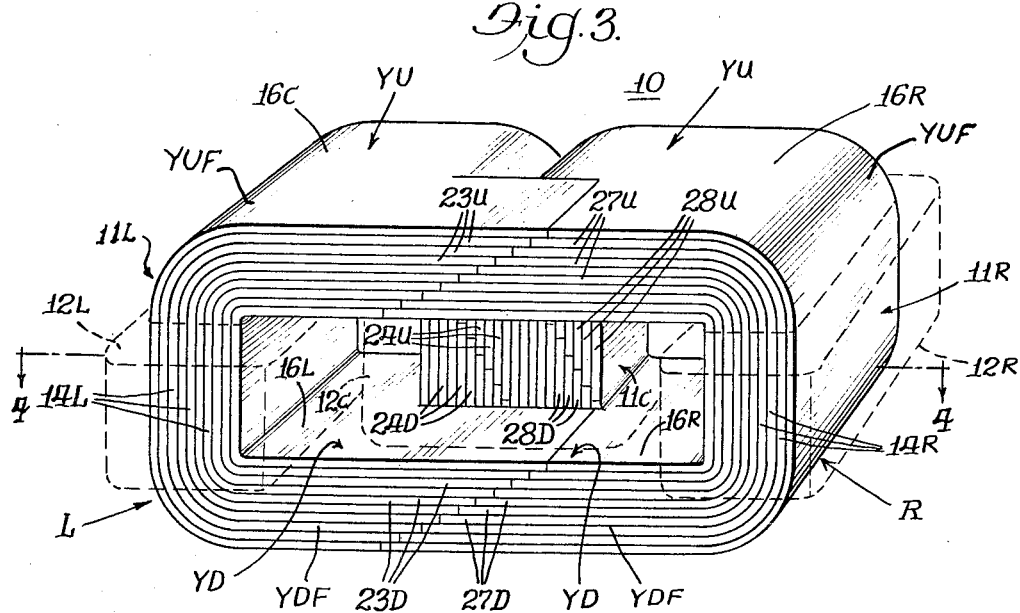
FIG. 3 is a perspective view of a three-phase transformer embodying the invention, the phase coils being shown in dotted lines.

Referring to FIGS. 3 and 4 of the drawing, the three phase transformer of the invention includes a three-legged magnetic core 10 having a vertical center leg 11C and outer vertical legs 11L and 11R linked respectively by phase coils 12C, 12L and 12R shown in dotted lines. The outer legs 11L and 11R respectively have a plurality of nested laminations 14L and 14R of full width W stacked to a thickness $h/2$. The center leg 11C has a plurality of laminations 14C of half width $W/2$ stacked to a thickness $h$. Three phase core 10 comprises a left core section L back-to-back with a right core section R, and the front portion of each core section L and R is generally of C-shaped and the rear portion thereof is generally of O-shaped or of a loop configuration. The front and rear C-shape and O-shape portions of each core section L and R are integral. The loop portions of the left and right core sections L and R abut to define core center legs 11C, and the C-shaped portions of the left and right core sections L and R abut to define upper and lower front yoke portions YUF and YDF which interconnect the outer core legs 11L and 11R.

The left and right core sections L and R are similar and complementary, therefore only left core section L will be described in detail. Left core section L comprises a plurality of nested flatwise bent laminations 14L which are of magnetic strip material having a preferred grain orientation, i.e., direction of easiest magnetization, longitudinally thereof. The ends of the laminations 14L are bifurcated. The full width, non-bifurcated portions 16L of laminations 14L are of a compactly nested and strained relieved C-shape and collectively define the outer leg 11L and the upper and lower core yokes YU and YD. The front furcations 23U and 23D at the ends of the upper and lower arms of the C-shape full-width portions 16L of the laminations 14L extend parallel to the longitudinal axis of core 10. The rear furcations 24U and 24D at the ends of the upper and lower arms of the C-shape full-width portions 16L of the laminations 14L extend vertically and meet in each lamination layer in butt joints 42 in center core leg 11C. The butt joints 42 of successive laminations 14L are staggered progressively in a flight along the length of center core leg 11C. The front furcations 23U and 23D of the laminations 14L of left core section L vary progressively in length and abut against the end of the front furcations 27U and 27D at the ends of the laminations 14R of the right core section R to define a series of progressively staggered butt joints or flights in the upper and lower front yoke portions YUF and YDF which interconnects the outer core legs 11L and 11R.

Figure 1:
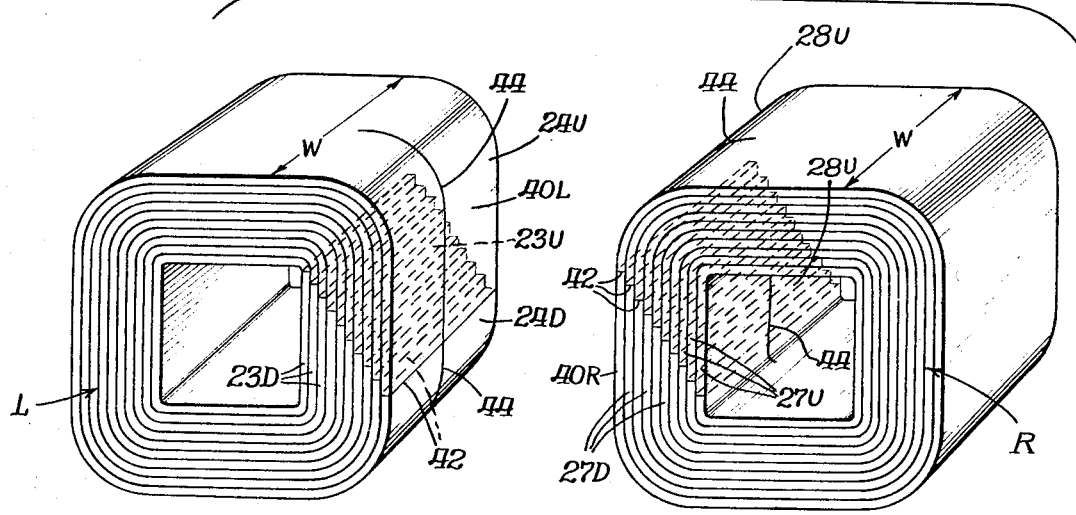
FIGS. 1 and 2 illustrate steps in a preferred method of constructing the three-legged magnetic core of the invention.

It is believed that a description of a preferred method of construction will facilitate an understanding of the multi-legged magnetic core of the invention. FIG. 1 of the drawing illustrates the step of winding two similar magnetic core sections L and R of magnetic strip material of width W and having a preferred direction of grain orientation lengthwise thereof in a generally rectangular configuration and to approximately the same number of turns and the same inner and outer dimensions. Each magnetic strip layer of core sections L and R may be cut across the width W in a single core leg 40L and 40R respectively of the core sections L and R to provide butt joints 42 in each layer of magnetic strip. The cuts and thus the butt joints 42 in radially successive layers are preferably staggered progressively along the entire length of core legs 40L and 40R. The butt joints 42 in core section L may begin adjacent the upper end of core leg 40L at the inner layer thereof, with the butt joints 42 in the radially successive layers occurring further down core leg 40L and the last butt joint 42 in the outer layer being adjacent the lower end of core leg 40L. The butt joints 42 in core section R preferably begin adjacent the lower end of core leg 40R adjacent the inner layer thereof with the butt joints 42 in radially successive layers occurring higher along the length of core leg 40R so that the last butt joint 42 in the outer layer is disposed approximately at the upper end of core leg 40R.

It will be appreciated that the magnetic strip must be shown in the drawing to be much thicker than it actually is and that in an actual core, magnetic strip of approximately .014 thickness may be utilized and that a plurality of flights of butt joints 42 may occur up and down the length of core legs 40R and 40L. Further, the butt joints 42 may, if desired, occur in the corner portions of the core sections and also in the yoke portions of the rectangular core sections.

Figure 2:
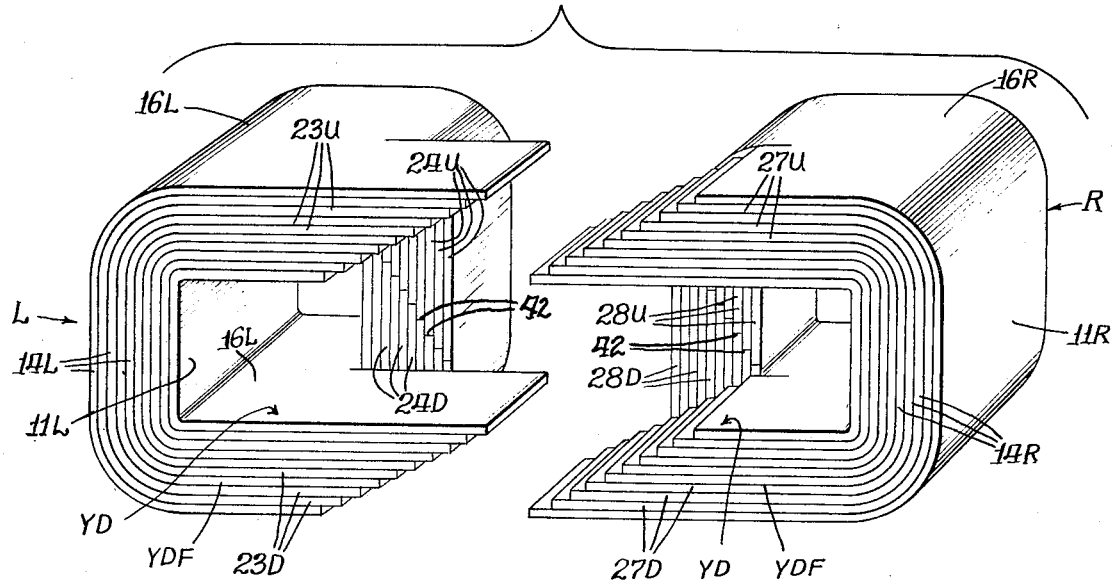

Both lamination ends which define butt joints 42 and core leg 40L are cut lengthwise of the lamination and approximately along the center line 44 of the magnetic strip to bifurcate both ends of each lamination and to provide front and rear furcations 23U and 24U at the upper end of core leg 40L and front and rear furcations 23D and 24D at the lower end of core leg 40L. The front furcations 23U and 23D are bent horizontal as shown in FIG. 2, and the rear furcations 24U and 24D are left in abutting relation.

In a similar manner, both ends of each lamination which form a butt joint 42 in the core leg 40R of right core section R may be cut along the lamination center line 44 to bifurcate both ends of each lamination and provide front and rear furcations 27U and 28U at the upper end of core leg 40R and front and rear furcations 27D and 28D at the lower end of core leg 40R. The front upper and lower furcations 27U and 27D are bent horizontal as shown in FIG. 2, and the rear upper and lower furcations are left in abutting relation.

The core sections L and R may then be annealed to remove strains on the magnetic strip material.

The rear furcations 24U and 24D of the left core section L may be separated and the upper furcations 24U–23U inserted collectively through the windows of the preformed phase coil 12L which surrounds left core leg 11L. Also, the rear furcations 24U and 24D may be inserted collectively through the window of the phase coil 12C which surrounds the center leg 11C. The rear furcations 28U and 28D of the right core sections R may then be separated and the upper furcations 27U–28U inserted through the window of the preformed phase coil 12R which surrounds core leg 11R. The right core section R may then be positioned adjacent left core section L and the ends of the rear furcations 28U and 28D of the right core section R separated and inserted through the window the phase coil 12C which surrounds the middle core leg 11C. When the core sections R and L are positioned adjacent each other, the ends of the upper and lower furcations 23U and 23D of the left core section L are also abutted against the ends of the upper and lower furcations 27U and 27D respectively of the right core section R in a flight of butt joints 42 staggered progressively along the length of the laminations.

The abutting rear furcations 24U–24D of the left core section 6 are thus back-to-back with the abutting rear furcations 28U–28D of the right core section R and jointly define core center leg 11C. The abutting furcations 24U–24D of the center core leg 11C are integral with the full-width, non-bifurcated portions 16L of lamination 14L which define the left core leg 11L. Thus, magnetic flux may transfer between the center core leg 11C and left core leg 11L along the length of the upper and lower yokes YU and YD between core legs 11L–11C at an angle which is very close to the direction of grain orientation of the full-width, non-bifurcated portions 16L, i.e., at a slight angle to the longitudinal axis of lamination 14L. Similarly, the abutting rear furcations 28Z–28D of center core leg 11C are integral with the full-width, non-bifurcated portion 16R of lamination 14R which defines the right core leg 11R. Magnetic flux can thus transfer between center leg 11C and right leg 11R along the length of hte upper and lower yokes YU and YD between the core legs 11R–11C at an angle which is very close to the direction of grain orientation of the full-width, non-bifurcated portion 16R.

The full width portions 16L of laminations 14L define left core leg 11L, the rear furcations 24U–24D thereof partially define center core leg 11C, and the front furcations 23U–23D thereof are in the same layer and form butt joints with the laminations 14R which define right core leg 11R and the remainder of center core leg 11C. It will thus be appreciated that each lamination layer is in each core leg and it is unnecessary for the magnetic flux to transfer between core legs through air paths perpendicular to the plane of the laminations.

Although a preferred embodiment of constructing the multi-legged magnetic core has been described and illustrated starting with the step of winding two similar core sections, it will be appreciated that the invention is not so limited and also comprehends other methods. For example, the core may be made by a process wherein flat magnetic strip material is formed into the C-shaped and loop portions or by a process wherein magnetic strip material is wound to a rectangular configuration which defines the outer core legs and the yokes and portions of the magnetic strip material in each yoke are bent toward the other yoke to form the center core leg.

While only a single embodiment of the invention has been illustrated and described, many modifications and variations thereof will be readily apparent to those skilled in the art. Consequently, it is intended to cover in the appended claims all such modifications and variations which are within the true spirit and scope of the invention.

What is claimed is:

1. A magnetic core having three aligned legs comprising left and right core sections of nested C-shaped laminations of magnetic strip material, said core sections being of approximately the same size and approximately the same number of laminations and having their open ends facing each other and defining the outer legs of said three-legged core and the yokes interconnecting said outer legs, the ends of said laminations being furcated and defining front and rear furcations in the upper and lower arms of each C-shaped lamination, the rear furcations of the upper and lower arms of each lamination being bent toward each other and meeting and forming a loop portion in said lamination, said loop portions of the laminations of said left and right core sections being back-to-back and jointly defining the center leg of said magnetic core, the front furcations of the laminations of each core section extending generally parallel to said upper and lower arms with the front furcations of the upper and lower arms of the left core section respectively engaging the front furcations of the upper and lower arms of the right core section whereby said outer core legs are interconnected.

2. A magnetic core according to claim 1 wherein said bent rear furcations of each lamination meet in a butt joint and the butt joints in successive laminations in each core sections are staggered progressively along said center core leg.

3. A magentic core according to claim 1 wherein said magnetic strip material has a preferred grain orientation lengthwise thereof and magnetic flux can transfer between said middle and outer core legs through said laminations at a small angle to said grain orientation.

4. A magnetic core according to claim 1 wherein the ends of said front furcations of the upper and lower arms respectively of the laminations of each left core section abut against the ends of the front furcations of the upper and lower arms of the laminations of said right core sections to interconnect said outer core legs.

5. A magnetic core according to claim 4 wherein successive butt joints formed between the ends of the laminations of said left and right core sections are progressively staggered lengthwise of said laminations.

6. A magnetic core having three aligned legs comprising a pair of core sections of nested C-shaped laminations of magnetic strip material having their open ends in abutting relation and combining the outer legs of said core and the yokes interconnecting said outer legs, the ends of said laminations being bifurcated and one furcation on each arm of each C-shaped lamination being bent toward the other arm thereof and said bent furcations on each lamination meeting and forming a loop portion on said lamination, said loop portions of laminations of each pair of core sections being back-to-back and defining the center leg of said core, whereby magnetic flux can transfer between said middle and outer legs through said laminations.

7. A magnetic core according to claim 6 wherein said bent furcations of each lamination meet in a butt joint and the butt joints of successive laminations are staggered longitudinally of said center leg of said core.

8. A magnetic core according to claim 7 wherein the ends of corresponding C-shaped laminations of said pair of core sections meet in butt joints at both said upper and lower arms and the butt joints of successive laminations are staggered longitudinally of said laminations.

9. A magnetic core according to claim 6 wherein said magnetic strip material has a preferred grain orientation lengthwise thereof and said magnetic flux can transfer between said middle and outer legs through said laminations at a small angle to said preferred grain orientation.

10. A magnetic core according to claim 7 further comprising an electrical winding having a window formed therein and wherein said bent furcations can be separated and collectively inserted through said window and said bent furcations inherently return to the butt joint relation with the butt joints of successive laminations staggered peripherally of said center core leg.

11. A three-legged magnetic core comprising a plurality of nested, flatwise bent rectangular laminations of magneitc strip material, one pair of opposed sides of said rectangular laminations defining the outer legs of said core and the other pair of opposed sides of said lamination defining the yokes interconnecting said outer legs, each of said other pair of opposed sides of each lamination having a portion bent toward the other yoke and said bent portions of each of said laminations terminating adjacent each other, said bent portions of said plurality of laminations defining the center leg of said three-legged core.

12. A magnetic core according to claim 11 wherein said magnetic strip material has a direction of easiest magnetization lengthwise thereof and the longitudinal axis of said bent portion is generally parallel to said direction of easiest magnetization.

13. A magnetic core according to claim 12 wherein said bent portions from each lamination abut and the butt joints in successive laminations are staggered progressively along said center leg.

14. The method of constructing a three-legged magnetic core from a pair of similar rectangular core sections each having a pair of legs and opposed sides connecting said legs comprising the steps of winding magnetic strip material having a preferred direction of grain orientation lengthwise thereof to form said similar rectangular core sections, cutting successive laminations in one leg of each of said core sections at progressively staggered points along the length of said one leg starting from the same side and an opposite end of said one leg in one of said core sections relative to said one leg in the other of the core sections to form a flight of staggered butt joints in said one leg, cutting both ends of each lamination in said one leg lengthwise approximately along the center line thereof to bifurcate said ends of said laminations and form front and rear furcations therein, maintaining the ends of the rear furcations in each lamination in abutting relation to form loop portions in each core section and disposing said front furcations generally parallel to the core sides to form a C-shaped portion in each core section, and positioning said core sections adjacent each other with said loop portions in said core sections back-to-back and with the open ends of said C-shaped portions facing each other and the front furcations of the laminations in one core section engaging the front furcations of the laminations of the other core section in both the upper and lower arms of said C-shaped portions.

References Cited

UNITED STATES PATENTS

| | | | |
|---|---|---|---|
| 2,360,511 | 10/1944 | Nelson | 336—212 |
| 2,483,159 | 9/1949 | Somerville | 336—217 XR |
| 2,702,936 | 3/1955 | Hunt | 336—211 XR |

THOMAS J. KOZMA, Primary Examiner

U.S. Cl. X.R.

29—609; 336—212, 217